United States Patent
Xu

(10) Patent No.: US 9,158,171 B2
(45) Date of Patent: Oct. 13, 2015

(54) PIXEL STRUCTURE, DISPLAY PANEL, AND LIQUID CRYSTAL DISPLAY

(71) Applicant: Shenzhen China Star Optoelectronics Technology Co., Ltd., Shenzhen, Guangdong (CN)

(72) Inventor: Liang Xu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 52 days.

(21) Appl. No.: 13/980,602

(22) PCT Filed: Jun. 24, 2013

(86) PCT No.: PCT/CN2013/077762
§ 371 (c)(1),
(2) Date: Jul. 19, 2013

(87) PCT Pub. No.: WO2014/186998
PCT Pub. Date: Nov. 27, 2014

(65) Prior Publication Data
US 2014/0347587 A1 Nov. 27, 2014

(30) Foreign Application Priority Data
May 21, 2013 (CN) .......................... 2013 1 0190592

(51) Int. Cl.
*G02F 1/1337* (2006.01)
*G02F 1/1368* (2006.01)
*G02F 1/133* (2006.01)
*G02F 1/1343* (2006.01)
*G09G 3/36* (2006.01)

(52) U.S. Cl.
CPC .......... *G02F 1/1368* (2013.01); *G02F 1/13306* (2013.01); *G02F 1/133707* (2013.01); *G02F 1/134336* (2013.01); *G09G 3/36* (2013.01); *G02F 2001/134345* (2013.01); *Y10T 428/18* (2015.01)

(58) Field of Classification Search
CPC ............... G02F 2001/134345; G02F 1/133707
See application file for complete search history.

(56) References Cited

U.S. PATENT DOCUMENTS

2008/0198290 A1* 8/2008 Su et al. .......................... 349/48

* cited by examiner

*Primary Examiner* — Phu Vu
(74) *Attorney, Agent, or Firm* — Andrew C. Cheng

(57) ABSTRACT

A pixel structure includes a first sub-pixel, a second sub-pixel, and a third sub-pixel, the three sub-pixels are arranged in a row and are all divided into a first region and a second region. The first region of the first pixel is above the second region of the first pixel. The first region of the third pixel is above the second region of the first pixel. The first region of the second pixel is below the second region of the second pixel. The first regions of two adjacent sub-pixels are not adjacent such that two first regions do not form the two consecutive points and thus do not form a lightspot. Furthermore, in a low grey value display, the color-mixing effect is better because the first regions of sub-pixels are arranged in a triangle distribution. This also improves the color-mixing effect of RGB colors.

7 Claims, 4 Drawing Sheets

PIXEL STRUCTURE, DISPLAY PANEL, AND LIQUID CRYSTAL DISPLAY

BACKGROUND OF THE INVENTION

1. Field of the Invention

The invention relates to a liquid crystal display field, and more particularly, to a pixel structure, a display panel, and a liquid crystal display.

2. Description of the Prior Art

As the progress of the information society, demands for displays are growing rapidly. In order to meet these demands, several types of flat displays are introduced. For example, LCD (liquid crystal display), PDP (plasma display panel), and OLED (organic light-emitting diode) displays are developed. In these flat displays, LCD display is widely utilized because of its low weight, small volume, low power consumption.

TN (twisted nematic) type or STN (super twisted nematic) type LCD displays have some problems of low contrasts or small view angle. In order to solve the problems, IPS (in plan switch) display mode and VA (vertical alignment) display mode are developed to provide a wide view angle.

For IPS display mode, it has very good wide view angle effect. However, in order to achieve a better display effect, the demands in the friction procedure of the manufacturing process are strict. This highly limits the tolerance of frictions. In mass productions, related problems may occur.

For VA display mode, as shown in FIG. 1a and FIG. 1b, the LCD display is composed of an upper substrate 11, a lower substrate 12, and negative liquid crystals 14 embedded between the two substrates. Transparent conducting layers (ITO) 13 are set on the inner sides of the two substrates 11 and 12, and form a vertical electrical field. The dielectric constant of the long axis of the negative liquid crystal is less than the dielectric constant of the direction vertical to the long axis. Therefore, when no vertical electrical field acts on the negative liquid crystals 14, the long axis of the liquid crystal is vertical to the substrate. When a vertical electrical field acts on the negative liquid crystals 14, the liquid crystal rotates in a specific direction under the effect of the electrical field and become vertical to the electrical field because the dielectric constant of the long axis of the liquid crystal is less. In contrast to the IPS display mode, the VA display mode does not need the rubbing procedure in the manufacturing process and thus has a great advantage in mass production.

But in contrast to the IPS display mode, the VA display mode has a severe color shift when it's viewed in a large viewing angle. Multiple solutions are provided. For example, coupling capacitor method (CC method), double TFT driving method (TT method), and charge sharing method are provided. Each of the method has its own advantages and disadvantages. But they have something in common. That is, they all divide a sub-pixel into two portions. One of the portions is called as Main portion, and the other is called as Sub portion. Usually, the Main portion is smaller than the Sub portion. This kind of design is called as 8-domain design.

The lighting point on the display panel is called as display panel lightspot, which is a physical damage of the display panel. This lightspot is formed because the inner light reflection plate is pressed by an external force or heated to slightly change its shape. As the demands of consumers are getting higher, a lightspot larger than ½ sub-pixel is unacceptable. However, in the actual manufacturing process, the lightspot is inevitable. Even the lightspot can be repaired into a normal spot, more production capacity is consumed.

The lightspot of the above-mentioned 8-domain design has its own characteristic. One condition is that the entire sub-pixel is bright. One condition is that only the Main portion of the sub-pixel is bright. One condition is that only the Sub portion of the sub-pixel is bright.

Under the condition that only the Main portion of the sub-pixel is bright, it does not influence display effects because it is smaller than ½ sub-pixel. It can be regarded as a normal spot instead of a lightspot. As shown in FIG. 2, if the Main portions of two adjacent sub-pixels are both bright, although each one of the Main portion cannot be regarded as a lightspot, they become a lightspot larger than ½ sub-pixel in horizontal because two Main portions are close to each other. This can be called as two consecutive points.

SUMMARY OF THE INVENTION

It is therefore one of the primary objectives of the claimed invention to provide a pixel structure, in order to solve the above-mentioned problem.

According to an exemplary embodiment of the claimed invention, a pixel structure is disclosed. The pixel structure comprises a first sub-pixel, a second sub-pixel, and a third sub-pixel. The first sub-pixel, the second sub-pixel, and the third sub-pixel are arranged in a row. The first sub-pixel, the second sub-pixel, and the third sub-pixel are all divided into a first region and a second region. The first region of the first pixel is above the second region of the first pixel. The first region of the third pixel is above the second region of the first pixel. The first region of the second pixel is below the second region of the second pixel.

Furthermore, the first region is smaller than the second region in each of the first, second, and third sub-pixels.

According to an exemplary embodiment of the claimed invention, a display panel is disclosed. The display panel comprises a plurality of first pixels and a plurality of second pixels arranged in a matrix. Each of the first pixels and each of the second pixels both comprise a first sub-pixel, a second sub-pixel, a third sub-pixel arranged in a row. The first sub-pixel, the second sub-pixel, and the third sub-pixel are all divided into a first region and a second region. The first region of the first pixel is above the second region of the first pixel, the first region of the third pixel is above the second region of the first pixel, and the first region of the second pixel is below the second region of the second pixel.

Furthermore, the first pixel and the second pixel are arranged in turns in a row, and a column is formed by all the first pixels or all the second pixels.

Furthermore, the first region is smaller than the second region in each of the first, second, and third sub-pixels.

Furthermore, the first region is smaller than the second region in each of the first, second, and third sub-pixels.

Furthermore, the display panel utilizes a liquid crystal driving module to drive each of first, second, and third sub-pixels, and utilizes a backlight to generate lights such that an image is displayed on the display panel.

According to another exemplary embodiment of the claimed invention, a liquid crystal display is disclosed. The liquid crystal display comprises a liquid crystal driving module, a backlight module, and a display panel. The liquid crystal driving module drives the display panel and the backlight module provides light to the display panel. The display panel comprises a plurality of first pixels and a plurality of second pixels arranged in a matrix. Each of the first pixels and each of the second pixels both comprise a first sub-pixel, a second sub-pixel, a third sub-pixel arranged in a row. The first sub-pixel, the second sub-pixel, and the third sub-pixel are all divided into a first region and a second region. The first region of the first pixel is above the second region of the first pixel, the first region of the third pixel is above the second region of the first pixel, and the first region of the second pixel is below the second region of the second pixel.

Furthermore, the first pixel and the second pixel are arranged in turns in a row, and a column is formed by all the first pixels or all the second pixels.

Furthermore, the first region is smaller than the second region in each of the first, second, and third sub-pixels.

Furthermore, the first region is smaller than the second region in each of the first, second, and third sub-pixels.

Furthermore, the display panel utilizes a liquid crystal driving module to drive each of first, second, and third sub-pixels, and utilizes a backlight to generate lights such that an image is displayed on the display panel.

Furthermore, the liquid crystal driving module comprises a gate driver coupled to each sub-pixel through scan lines extended in a column direction, for sequentially outputting scanning signal to the scan lines, a source driver coupled to each sub-pixel through data lines extended in a row direction, for outputting data signal to the data lines, and a timing controller coupled to the gate driver and the source driver, for controlling the gate driver and the source driver.

In contrast to the related art, the present invention pixel structure, display panel, and liquid crystal display rearrange the sub-pixels of the pixels of the display panel. The present invention makes the first regions of two adjacent sub-pixels not adjacent such that two first regions do not form the two consecutive points and thus do not form a lightspot. Furthermore, in a low grey value display, the color-mixing effect is better because the first regions of sub-pixels are arranged in a triangle distribution. This also improves the color-mixing effect of RGB colors.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1A:
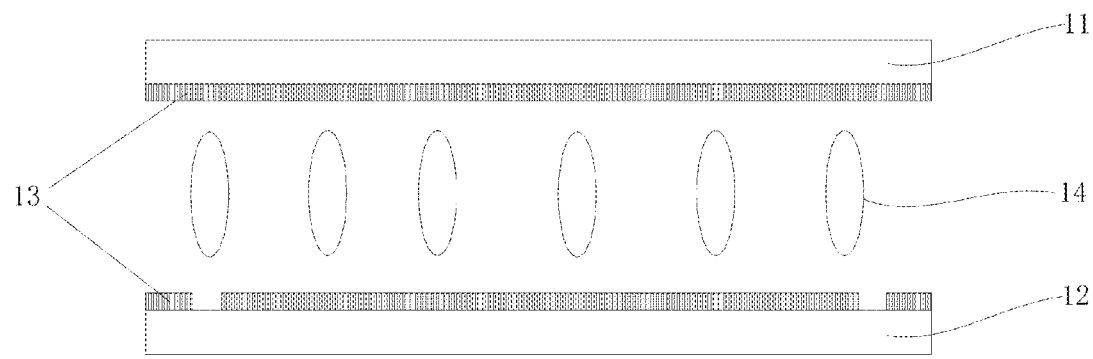
FIG. 1a is a diagram showing a VA display mode without applying any voltages according to the related art.
Figure 1B:
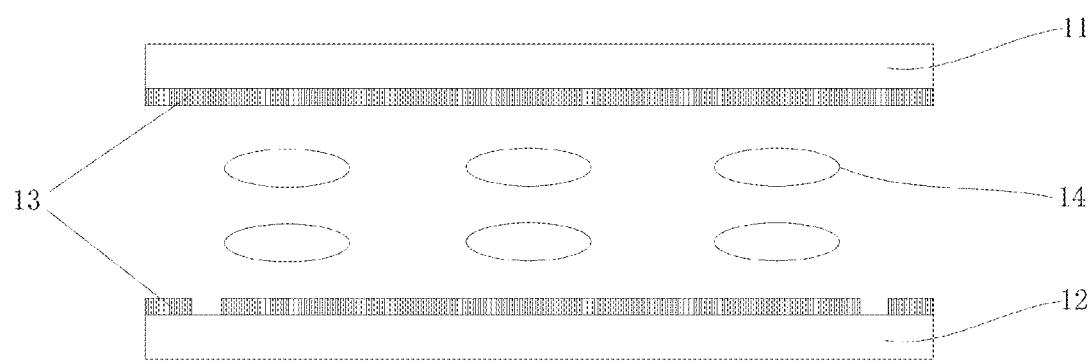
FIG. 1b is a diagram showing a VA display mode with applied voltages according to the related art.
Figure 2:
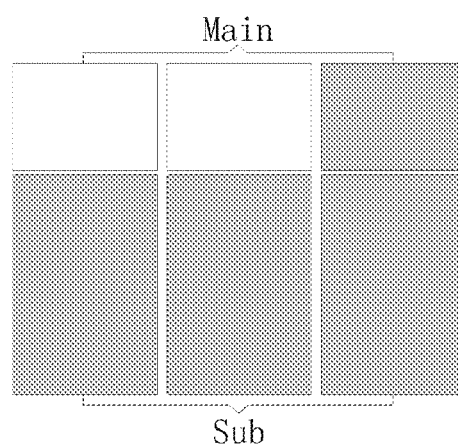
FIG. 2 is a diagram showing two adjacent fractured bright points become a lightspot according to the related art.
Figures 3, 4:
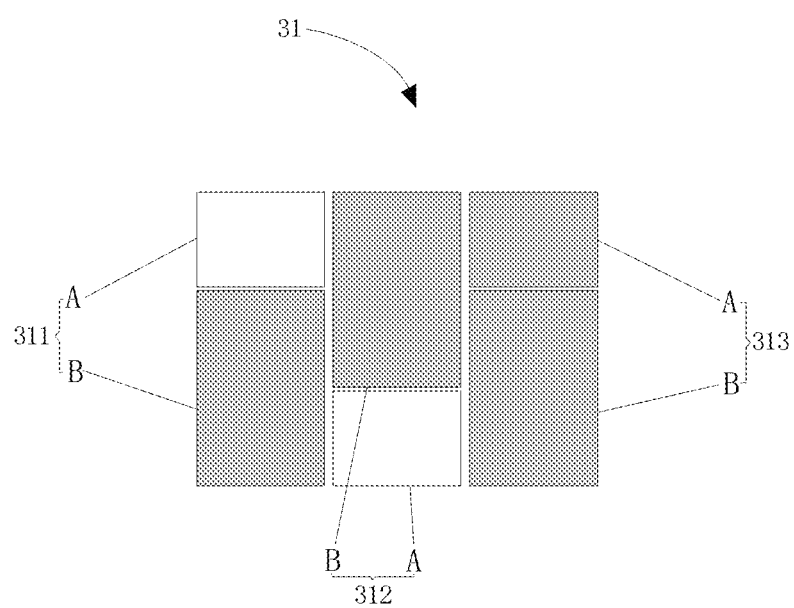
FIG. 3 is a diagram showing a sub-pixel arrangement of a display panel according to an embodiment of the present invention.
FIG. 4 is a diagram showing a sub-pixel arrangement of a first pixel according to an embodiment of the present invention.
Figure 5:
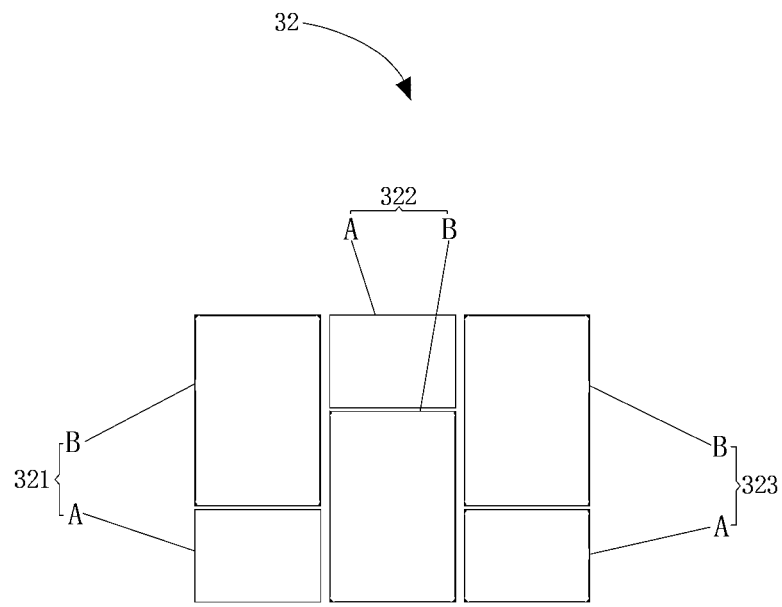
FIG. 5 is a diagram showing a sub-pixel arrangement of a second pixel according to an embodiment of the present invention.

FIG. 3 is a diagram showing a sub-pixel arrangement of a display panel according to an embodiment of the present invention. FIG. 4 is a diagram showing a sub-pixel arrangement of a first pixel according to an embodiment of the present invention. FIG. 5 is a diagram showing a sub-pixel arrangement of a second pixel according to an embodiment of the present invention. Please note, FIG. 3 only depicts a part of pixels. This is for simplicity, not a limitation of the present invention.

Please refer to FIG. 3, the display panel comprises a plurality of first pixels 31 and a plurality of pixels 32 arranged in a matrix. The first pixel 31 and the second pixel 32 are two kinds of pixels having different specifications, and they will be illustrated in the following disclosure.

Let's take the first pixel 31 as an example. Please refer to FIG. 4. the first pixels comprises a first sub-pixel 311, a second sub-pixel 312, and a third sub-pixel 313 arranged in a row. Based on the 8-domain design, the first sub-pixel 311, each of the second sub-pixel 312, and the third sub-pixel 313 is divided into a first region A and a second region B. In this embodiment, the first region A is the Main region, and the second region B is the Sub region. The first region A and the second region B have different sizes. Optimally, in a sub-pixel, the first region A is smaller than the second region B.

In addition, in this embodiment, assume that the first regions A of the first sub-pixel 311 and the second sub-pixel 312 of the first pixel 31 are both bright. In order to prevent the first regions A of two adjacent sub-pixels from being adjacent to form two consecutive points, the first region A of the first sub-pixel 311 is arranged to be above the second region B of the first sub-pixel 311 and the first region A of the second sub-pixel 312 is arranged to be below the second region B of the second sub-pixel 312. Similarly, in order to prevent the first regions A of the second sub-pixel 312 and the third sub-pixel 313 from being adjacent to form two consecutive points, the first region A of the third sub-pixel 313 is arranged to be above the second region B of the third sub-pixel 313. That is, in the first pixel 31, the first regions A of the three sub-pixels are arranged as an upside-down triangle.

Moreover, in the first pixel 31, the first sub-pixel 311, the second sub-pixel 312, and the third sub-pixel 313 can be any one of the RGB sub-pixels. The colors of the three sub-pixels can be different. For example, the first sub-pixel 311 can be a Red sub-pixel, the second sub-pixel can be a Green sub-pixel, and the third sub-pixel 313 can be a Blue sub-pixel.

Please refer to FIG. 5, the second pixel 32 also comprises a first sub-pixel 321, a second sub-pixel 322, and a third sub-pixel 323 arranged in a row. Based on the 8-domain design, the first sub-pixel 321, each of the second sub-pixel 322, and the third sub-pixel 323 is divided into a first region A and a second region B. In this embodiment, the first region A is the Main region, and the second region B is the Sub region. The first region A and the second region B have different sizes. Optimally, in a sub-pixel, the first region A is smaller than the second region B. However, this is not a limitation of the present invention. The first region A can be larger than the second region B.

In addition, assume that the first regions A of the first sub-pixel 321 and the second sub-pixel 322 of the first pixel 32 are both bright. In order to prevent the first regions A of two adjacent sub-pixels of the second pixel 32 from being adjacent to form two consecutive points, the first region A of the first sub-pixel 321 is arranged to be below the second region B of the first sub-pixel 321 and the first region A of the second sub-pixel 322 is arranged to be above the second region B of the second sub-pixel 322. Similarly, in order to prevent the first regions A of the second sub-pixel 322 and the third sub-pixel 323 from being adjacent to form two consecutive points, the first region A of the third sub-pixel 323 is arranged to be below the second region B of the third sub-pixel 323. That is, in the first pixel 32, the first regions A of the three sub-pixels are arranged as an triangle.

Moreover, in the first pixel 32, the first sub-pixel 321, the second sub-pixel 322, and the third sub-pixel 323 can be any one of the RGB sub-pixels. The colors of the three sub-pixels can be different. For example, the first sub-pixel 321 can be a Red sub-pixel, the second sub-pixel can be a Green sub-pixel, and the third sub-pixel 323 can be a Blue sub-pixel.

Furthermore, please refer to FIG. 3-FIG. 5, in the first pixels 31 and the second pixels 32, in order to prevent the first regions A of two adjacent sub-pixels in two adjacent pixels from forming two consecutive points, in this embodiment, the first pixels 31 and the second pixels 32 are arranged alternatively in every row. Furthermore, a column comprises all pixels having the same specification. For example, a column may comprise only the first pixels 31 or only the second pixels 32. In this way, for the entire display panel, when it is displayed in a low gray value, the first regions A of sub-pixels are arranged in triangles such that the space color mixing effect of the first region A is better such that the RGB color mixing is improved.

Figure 6:
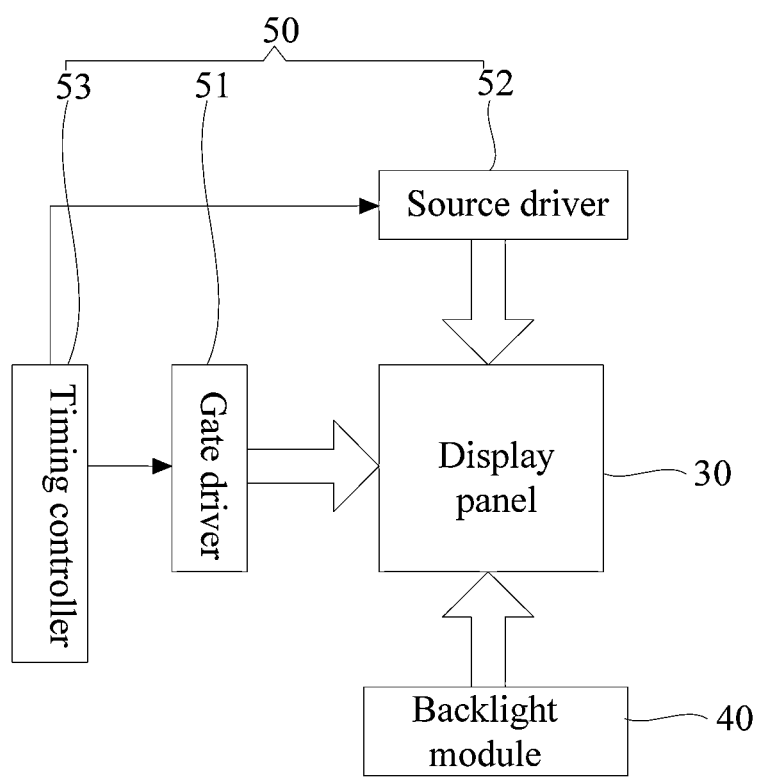
FIG. 6 is a diagram showing an LCD display according to an embodiment of the present invention.

FIG. 6 is a diagram showing an LCD display according to an embodiment of the present invention.

Please refer to FIG. 6. The LCD display comprises a backlight module 40, a display panel 30, and an LCD driving module 50. The display panel 30 comprises the above-mentioned pixel arrangement structure. The LCD driving module 50 drives each of the sub-pixels of the display panel 30, The backlight module 40 provides lights to the display panel 30 such that the display panel 30 can display images.

The LCD driving module 50 comprises a gate driver 51, a source driver (source driver) 52, and a timing controller 53. The source driver 52 is connected to the sub-pixels via data lines to provide data signals (pixel voltages) to the sub-pixels. The gate driver 51 is connected to the sub-pixels via scan lines to provide scanning signals to the scan lines. The scan lines and the data lines are arranged alternatively. The timing controller 53 is a control center to control the timing of the LCD display. The timing controller 53 activates the gate driver 52 according to the timing of each frame, and transforms video signals inputted from an interface into data signals of the source driver 52. And then, the timing controller 53 controls the gate driver 51 to scan a row, and controls the source driver 52 to provide the data signals to the row via the data lines.

In this embodiment, the backlight module 40 can be a direct-type backlight module or an edge type backlight module.

Figure 7:
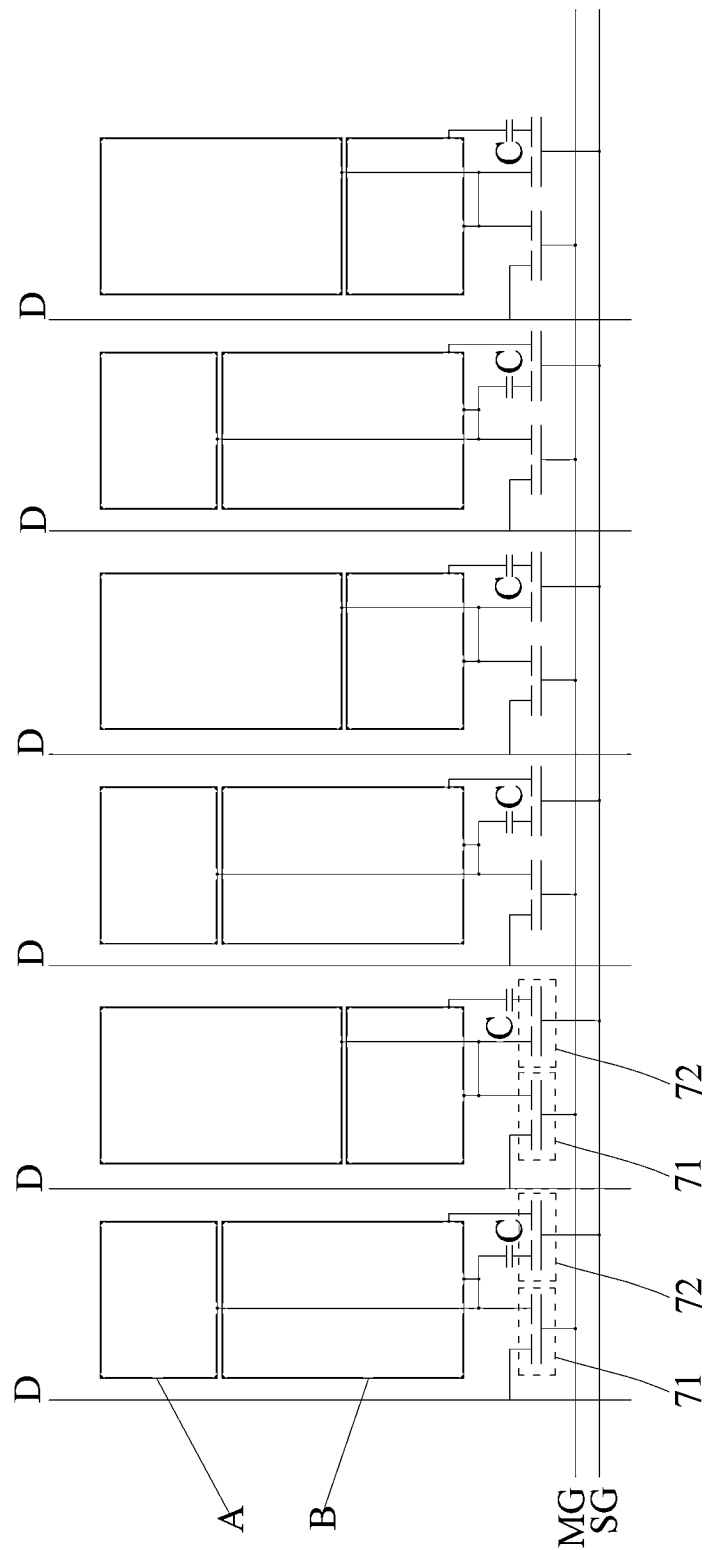
FIG. 7 is a diagram showing a gate driver and a source driver drive a sub-pixel according to an embodiment of the present invention.

FIG. 7 is a diagram showing a gate driver and a source driver drive a sub-pixel according to an embodiment of the present invention. Please note, in FIG. 7, for simplicity, only a part of sub-pixels of a row of a display panel are driven. However, the other sub-pixels of the display panel are driven in a similar way.

Please refer to FIG. 7, assume that the first region A and the second region B of each of the sub-pixel does not form a lightspot. When the gate driver provides a scanning signal to a main scan line MG, the gates of the first TFTs 71 connected to the main scan line MG are turned on. At this time, the sources of the TFTs 71 connected to the data line D receive the data signals (pixel voltages) from the source driver, and then the data signals are transferred to the first region A and the second region B of each of the sub-pixel to charge each of the sub-pixels. However, the first region A and the second region B of each of the sub-pixel may receive different charging voltages. When the gate driver turns off the main scan line MG and provides a scanning signal to the scan line SG, the gates of the second TFTs 72 connected to the scan line SG are turned on. At this time, the charge-sharing capacitors C connected to the second TFTs 72 balance the charges of the first region A and the second region B to make the voltage of the first region A and the second region B equal such that the charging procedure of each sub-pixel is completed.

In contrast to the related art, the present invention pixel structure, display panel, and liquid crystal display rearrange the sub-pixels of the pixels of the display panel. The present invention makes the first regions of two adjacent sub-pixels not adjacent such that two first regions do not form the two consecutive points and thus do not form a lightspot. Furthermore, in a low grey value display, the color-mixing effect is better because the first regions of sub-pixels are arranged in a triangle distribution. This also improves the color-mixing effect of RGB colors.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pixel structure, comprising:
a first sub-pixel;
a second sub-pixel; and
a third sub-pixel, wherein the first sub-pixel, the second sub-pixel, and the third sub-pixel are arranged in a row;
wherein the first sub-pixel, the second sub-pixel, and the third sub-pixel are all divided into a first region and a second region, the first region of the first pixel is above the second region of the first pixel, the first region of the third pixel is above the second region of the first pixel, and the first region of the second pixel is below the second region of the second pixel,
wherein the first region is smaller than the second region in each of the first, second, and third sub-pixels, and the first region in each of the first, second, and third sub-pixels is coupled to a charge-sharing capacitor.

2. A display panel, comprising:
a plurality of first pixels and a plurality of second pixels arranged in a matrix;
wherein each of the first pixels and each of the second pixels both comprise a first sub-pixel, a second sub-pixel, a third sub-pixel arranged in a row, the first sub-pixel, the second sub-pixel, and the third sub-pixel are all divided into a first region and a second region, the first region of the first pixel is above the second region of the first pixel, the first region of the third pixel is above the second region of the first pixel, and the first region of the second pixel is below the second region of the second pixel,
wherein the first region is smaller than the second region in each of the first, second, and third sub-pixels, and the first region in each of the first, second, and third sub-pixels is coupled to a charge-sharing capacitor.

3. The display panel of claim 2, wherein the first pixel and the second pixel are arranged in turns in a row, and a column is formed by all the first pixels or all the second pixels.

4. The display panel of claim 2, wherein the display panel utilizes a liquid crystal driving module to drive each of first, second, and third sub-pixels, and utilizes a backlight to generate lights such that an image is displayed on the display panel.

5. A liquid crystal display comprising a display panel, a liquid crystal driving module for driving the display panel, and a backlight module for providing light to the display panel, the display panel comprising:
  a plurality of first pixels and a plurality of second pixels arranged in a matrix;
  wherein each of the first pixels and each of the second pixels both comprise a first sub-pixel, a second sub-pixel, a third sub-pixel arranged in a row, the first sub-pixel, the second sub-pixel, and the third sub-pixel are all divided into a first region and a second region, the first region of the first pixel is above the second region of the first pixel, the first region of the third pixel is above the second region of the first pixel, and the first region of the second pixel is below the second region of the second pixel,
  wherein the first region is smaller than the second region in each of the first, second, and third sub-pixels, and the first region in each of the first, second, and third sub-pixels is coupled to a charge-sharing capacitor.

6. The liquid crystal display of claim 5, wherein the first pixel and the second pixel are arranged in turns in a row, and a column is formed by all the first pixels or all the second pixels.

7. The liquid crystal display of claim 5, wherein the liquid crystal driving module comprises:
  a gate driver coupled to each sub-pixel through scan lines extended in a column direction, for sequentially outputting scanning signal to the scan lines;
  a source driver coupled to each sub-pixel through data lines extended in a row direction, for outputting data signal to the data lines; and
  a timing controller coupled to the gate driver and the source driver, for controlling the gate driver and the source driver.

* * * * *